United States Patent
Canny et al.

(10) Patent No.: US 8,364,627 B2
(45) Date of Patent: Jan. 29, 2013

(54) METHOD AND SYSTEM FOR GENERATING A LINEAR MACHINE LEARNING MODEL FOR PREDICTING ONLINE USER INPUT ACTIONS

(75) Inventors: John Canny, Berkeley, CA (US); Shi Zhong, Santa Clara, CA (US); Scott Gaffney, San Francisco, CA (US); Chad Brower, Campbell, CA (US); Pavel Berkhin, Sunnyvale, CA (US); George H. John, Redwood City, CA (US)

(73) Assignee: Yahoo! Inc., Sunnyvale, CA (US)

( * ) Notice: Subject to any disclaimer, the term of this patent is extended or adjusted under 35 U.S.C. 154(b) by 223 days.

(21) Appl. No.: 13/018,303

(22) Filed: Jan. 31, 2011

(65) Prior Publication Data

US 2011/0131160 A1    Jun. 2, 2011

Related U.S. Application Data

(63) Continuation of application No. 11/770,413, filed on Jun. 28, 2007, now Pat. No. 7,921,069.

(51) Int. Cl.
*G06F 17/00* (2006.01)
*G06N 5/02* (2006.01)

(52) U.S. Cl. ........................................... 706/47

(58) Field of Classification Search .................. None
See application file for complete search history.

(56) References Cited

U.S. PATENT DOCUMENTS

| | | | | |
|---|---|---|---|---|
| 6,460,036 | B1 * | 10/2002 | Herz | 707/748 |
| 2007/0124300 | A1 * | 5/2007 | Bent | 707/5 |
| 2008/0154668 | A1 * | 6/2008 | Kuo et al. | 705/7 |

* cited by examiner

*Primary Examiner* — Jeffrey A Gaffin
*Assistant Examiner* — Li-Wu Chang
(74) *Attorney, Agent, or Firm* — Stattler-Suh PC

(57) ABSTRACT

A method of targeting receives several granular events and preprocesses the received granular events thereby generating preprocessed data to facilitate construction of a model based on the granular events. The method generates a predictive model by using the preprocessed data. The predictive model is for determining a likelihood of a user action. The method trains the predictive model. A system for targeting includes granular events, a preprocessor for receiving the granular events, a model generator, and a model. The preprocessor has one or more modules for at least one of pruning, aggregation, clustering, and/or filtering. The model generator is for constructing a model based on the granular events, and the model is for determining a likelihood of a user action. The system of some embodiments further includes several users, a selector for selecting a particular set of users from among the several users, a trained model, and a scoring module.

20 Claims, 6 Drawing Sheets

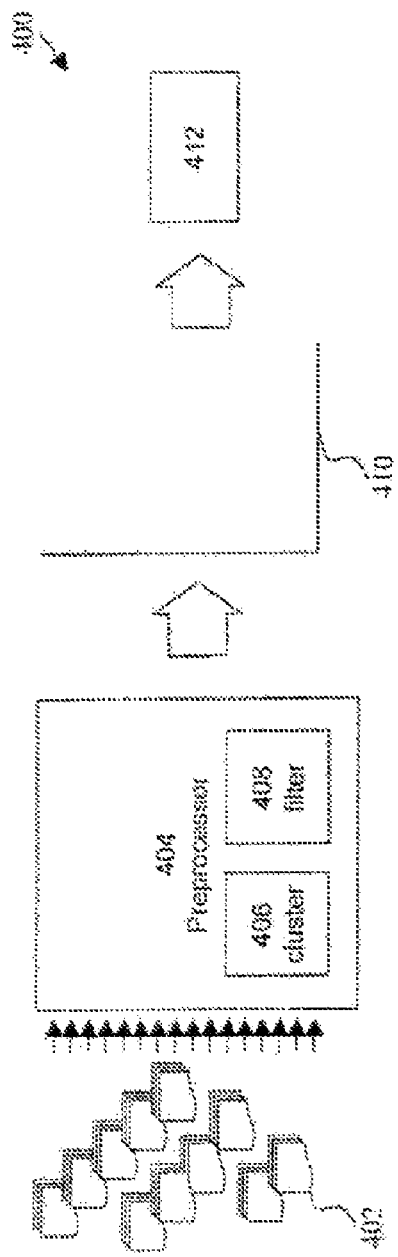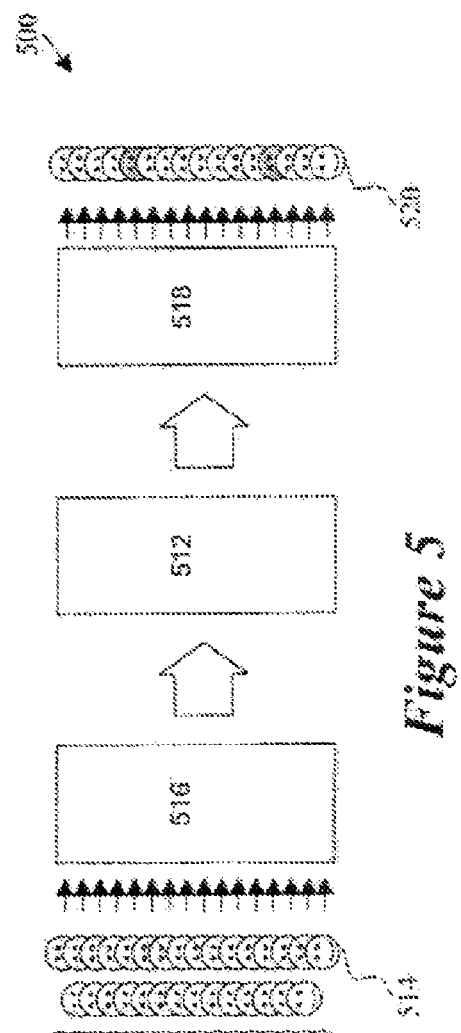

METHOD AND SYSTEM FOR GENERATING A LINEAR MACHINE LEARNING MODEL FOR PREDICTING ONLINE USER INPUT ACTIONS

RELATED APPLICATIONS

This patent application claims benefit and priority to, under 35 U.S.C. 120, and is a continuation of United States patent application entitled "Granular Data For Behavioral Targeting Using Predictive Models", having Ser. No. 11/770,413, filed on Jun. 28, 2007, now U.S. Pat. No. 7,921,069 which is expressly incorporated by reference.

FIELD OF THE INVENTION

The present invention is directed towards the field of targeting, and more particularly toward granular data for behavioral targeting.

BACKGROUND OF THE INVENTION

The Internet provides a mechanism for merchants to offer a vast amount of products and services to consumers. Internet portals provide users an entrance and guide into the vast resources of the Internet. Typically, an Internet portal provides a range of search, email, news, shopping, chat, maps, finance, entertainment, and other Internet services and content. Yahoo, the assignee of the present invention, is an example of such an Internet portal.

When a user visits certain locations on the Internet (e.g., web sites), including an Internet portal, the user enters information in the form of online activity. This information may be recorded and analyzed to determine behavioral patterns and interests of the user. In turn, these behavioral patterns and interests may be used to target the user to provide a more meaningful and rich experience on the Internet, such as an Internet portal site. For example, if interests in certain products and services of the user are determined, advertisements, pertaining to those products and services, may be served to the user. A behavior targeting system that serves advertisements benefits both the advertiser, who provides their message to a target audience, and a user that receives advertisements in areas of interest to the user.

Currently, advertising through computer networks such as the Internet is widely used along with advertising through other mediums, such as television, radio, or print. In particular, online advertising through the Internet provides a mechanism for merchants to offer advertisements for a vast amount of products and services to online users. In terms of marketing strategy, different online advertisements have different objectives depending on the user toward whom an advertisement is targeted.

Often, an advertiser will carry out an advertising campaign where a series of one or more advertisements are continually distributed over the Internet over a predetermined period of time. Advertisements in an advertising campaign are typically branding advertisements but may also include direct response or purchasing advertisements.

SUMMARY OF THE INVENTION

A method of targeting receives several granular events and preprocesses the received granular events thereby generating preprocessed data to facilitate construction of a model based on the granular events. The method generates a predictive model by using the preprocessed data. The predictive model is for determining a likelihood of a user action. The method trains the predictive model.

A system for targeting includes granular events, a preprocessor for receiving the granular events, a model generator, and a model. The preprocessor has one or more modules for at least one of pruning, aggregation, clustering, and/or filtering. The model generator is for constructing a model based on the granular events, and the model for determining a likelihood of a user action. The system of some embodiments further includes several users, a selector for selecting a particular set of users from among the several users, a trained model, and a scoring module. The trained model is for receiving the users and providing a metric that indicates a relationship of each user to the user action. The scoring module is for organizing a set of metrics associated with each user in the set of users.

Hence, some embodiments select a user from among several users, apply the predictive model to the selected user, and score the user by using the predictive model. By using the scoring, users are conveniently ranked in relation to other users to generate a set of ranked users. From the ranked set of users, a subset of ranked users is advantageously identified for various uses, such as for additional targeting steps. In a particular embodiment, the preprocessing includes clustering by data type. The data type preferably includes at least one of: search, search-click, sponsored search-click, page view, advertisement view, and ad-click. The clustering preserves information about a predicted target, and typically involves an automated process. Alternatively, or in conjunction with the clustering, the preprocessing further selectively includes pruning, aggregating, and/or filtering the received granular events, prior to the modeling. Some implementations classify the user action into one or more classes that form a distribution based on the received granular events. For instance, some implementations classify into a binary distribution.

Preferably, the granular event is one or more of: viewing a web page, clicking on a link in the page, clicking on an advertisement in the page, issuing a search query, such as by using a search engine, filling out a form, posting, rating a page, rating a product, and/or performing a transaction. When the granular events involve searches, for instance, embodiments of the invention track a number of clicks on one or more of the search result(s). When the granular events include page views, a number of page views is counted, for each page in a set of pages. Some embodiments use the predictive model to predict, for a predetermined period of time, the number of user ad clicks and/or ad views. The predictive model uses one or more of a support vector machine, a Bayesian type machine, a maximum entropy network, a logistic regression machine, and a linear regression model. Preferably, the predictive model has a weight for each granular event that is determined by training. A particular embodiment uses a Poisson type model with a parameter that has a linear combination of granular event counts. The event counts are typically stored and/or retrieved from a behavioral history.

BRIEF DESCRIPTION OF THE DRAWINGS

The novel features of the invention are set forth in the appended claims. However, for purpose of explanation, several embodiments of the invention are set forth in the following figures.

FIG. 4 illustrates a system for model generation.

FIG. 5 illustrates a system for scoring.

DETAILED DESCRIPTION

Figure 1:
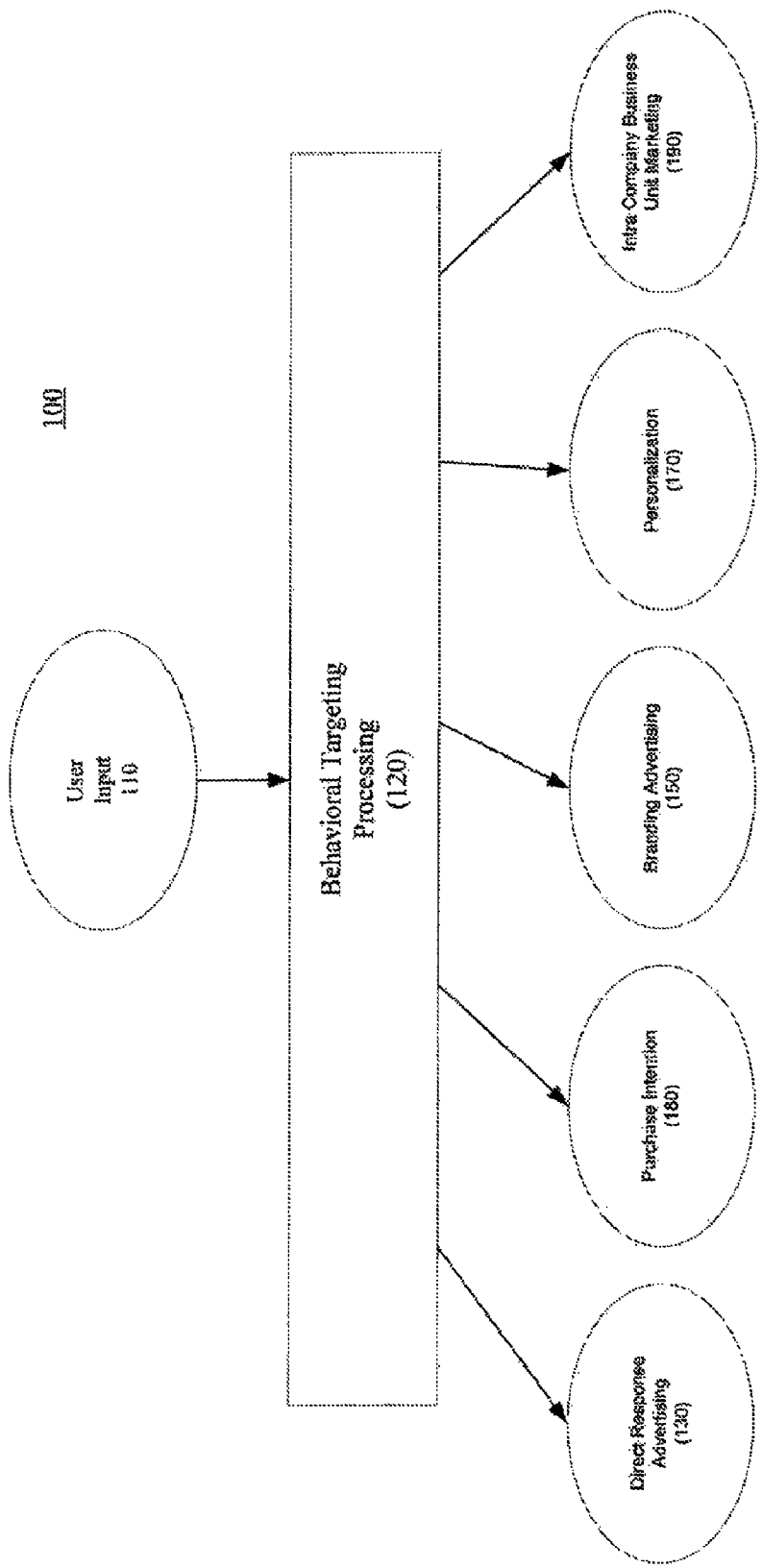
FIG. 1 illustrates a generalized behavioral targeting system.

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

In general, Behavioral Targeting (BT) as applied to the Internet refers to the targeting of activities, such as advertisements, to users based on online behavioral history. Embodiments of the invention focus on behavioral data comprising many user activities or events tracked across a network of web sites and logged by various web servers. Activities pertaining to a user include all, but are not limited to: viewing a web page, clicking on a link in the page, clicking on an advertisement in the page, issuing a search query such as by using a search engine, filling out a form, posting a piece of text, rating a page and/or a product, and executing a transaction, for example. Each of these activities is referred to herein as a granular event and typically, there are millions of such granular events of user behavior during a given period of time.

Behavioral Targeting models are predictive models that are built for the purpose of identifying and/or ranking a target set of users for presentation with a particular advertisement or set of ads. These behavioral targeting models utilize automatically learned user behavioral-patterns from historical user data to predict future event responses. Some event responses that are desirably predicted include future ad clicks, page views, and/or advertiser conversions. Due to the huge volume, high dimensionality, and the sparseness of behavioral data, granular events are conventionally grouped into specific business categories. The business categores are often within a predefined taxonomy and predictive models are then built on this category-aggregated data.

An example of a categorized event includes performing one of the granular events described above in relation to a particular category, such as viewing a page within the category "Automobiles," for example. Another example of a categorized event includes issuing a search query in the category "Finance/Mortgage." Other additional categorized events may be used without deviating from the spirit or scope of the invention.

The number of such categories is much smaller than the total number of different possible events. Hence, the categories simplify the management and/or tabulation of events within each category. However, one drawback of the categorization approach is that important information is lost during the categorization process. For example, the grouping of events into arbitrary business categories necessarily compacts several individual events into larger category-level events, which results in a loss of data resolution. Since the design of the categories themselves involves grouping that is often business-driven rather than problem-driven, there is an even greater likelihood for a loss of information. Furthermore, the categorization must often be carried out in an automated manner in which case there is a risk of an incorrect categorization or of no category at all, which undesirably results in a low or no confidence categorization.

An additional drawback is that it is difficult to include new event types into the categorization scheme since an appropriate categorization methodology must be adapted for every new data stream, which is often difficult and time-consuming.

In view of the foregoing, embodiments of the invention include a methodology for building predictive behavioral targeting models. The models are for identifying and/or ranking a target set of users for a target objective, such as presentation of a particular advertisement, or subset of advertisements. Preferably, the models are based on granular events. Advantageously, the models generated by using granular events do not utilize any predefined set of business categories for the grouping of such events. Particular embodiments build models directly from the granular events, or alternatively, sets of granular events are first grouped and then the models are built from the grouped granular events, or are built by using a combination of granular events and groups. Some embodiments automatically group granular events in a problem-driven manner and/or by using knowledge learned from historical data. Preferably, these embodiments are not dependent on the availability of a predefined set of business categories or on procedures for mapping every event type into any particular category set. Moreover, these embodiments are generally applicable for the prediction of any type of event using historical behavioral data such as, for instance, predicting advertising related events such as advertisement targeting.

Formulation and Implementation

As mentioned above, the goal of behavioral targeting is to identify and/or rank a target set of users for a target objective, such as presentation of a particular advertisement or a subset of advertisements. The problem of behavioral targeting is divided or re-formulated in different ways. One useful formulation is to characterize a relationship between a multitude of granular events and a desirable result. The relationship is typically expressed by using one or more models. One particularly useful desirable result to model relates to the granular event of advertisement clicking. More specifically, this particular formulation seeks to predict the click propensity of a user for an advertisement or set of advertisements given one or more users' event history. Additional factors are optionally included such as, for example, a user's click propensity is measured over a specific period of time. Similarly, the event history data is collected over a selected period of time.

For instance, in an implementation of the specific desirable result of ad clicking, $P_{(U,A)}$ designates the click propensity of a user U for a given advertisement or group of advertisements A. In this implementation, $\Lambda$ is a set of parameters associated with some parametric predictive model, f. Hence, conveniently, the click propensity $P_{(U,A)}$ expresses a function of U, A, and $\Lambda$:

$$P_{(U,A)} = f(U,A,\Lambda),$$

where U is represented by the set of granular events associated with the user, A is an identifier for an advertisement or an ad group, and f(•) is a mapping function. The set of parameters $\Lambda$ is estimated from historical data by optimizing an appropriate criterion.

One of ordinary skill recognizes that the foregoing illustrates a specific implementation relating to click propensity for a particular advertisement, and that the formulation of $P_{(U,A)}$ alternatively represents the relationship of the user U to a variety of desirable results. Further, given the huge number of granular events that include, for example, views, accesses, and/or downloads of millions of web pages, tens of millions of search queries and/or keywords, and millions of advertisements, some embodiments perform particular advantageous steps.

For instance, particular embodiments preprocess the many granular events to generate a limited number of features that are used for a modeling phase. Some of these embodiments then employ an efficient modeling technique for which both learning the parameters from a large amount of historical data and scoring new users is optimized. In these implementations, both model training and user scoring preferably scales linearly with the number of training examples as well as with the number of input features. Some embodiments include implementations that incorporate one or more of three components: (1) preprocessing of granular events, (2) modeling, learning model parameters, and/or training, and (3) scoring and/or ranking users based on the learned or trained models. Some of these method implementations are further described below, with reference, where appropriate, to the ad click propensity example given above.

Figure 2:
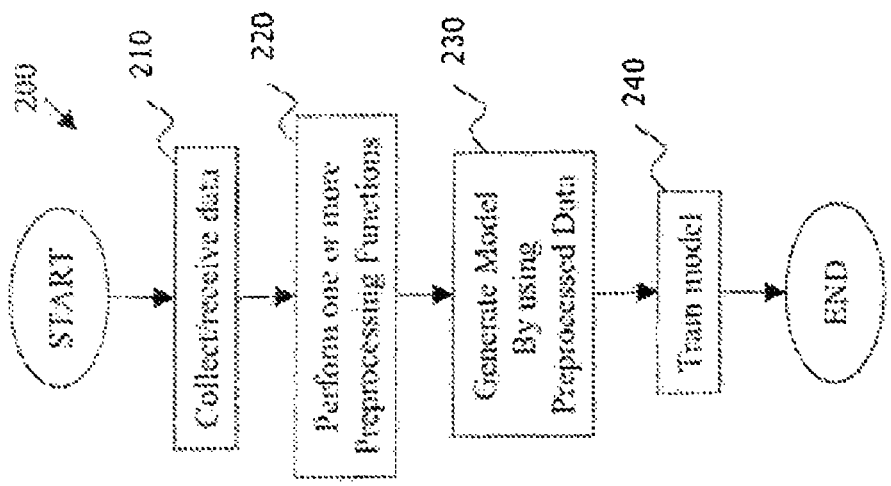
FIG. 2 is a process of predictive model generation and training.

Accordingly, FIG. 2 illustrates a process 200 of model generation and/or training. As shown in this figure, the process 200 begins at the step 210, where data are collected and/or received. Preferably the data comprise many granular events as described above.

Once the data are collected at the step 210, the process 200 transitions to the step 220, where preprocessing is performed. Due to the volume of granular events that occur, the preprocessing of some implementations is critical for efficient and/or practical application.

Preprocessing of Granular Events

More specifically, embodiments of the invention advantageously perform one or more of the following preprocessing steps to reduce the number of features prior to the modeling phase: (1) pruning of sparse granular events, (2) aggregating of events over time, and/or (3) clustering.

(1) Pruning of sparse granular events. To reduce the number of events to be modeled, some implementations advantageously prune "noise" or events that occur across fewer than m users, where m is advantageously user-defined, pre-defined and/or selected.

(2) Aggregating over time. Particular embodiments advantageously keep one total count for each event over a predetermined training time period. The total count is optionally a time-weighted aggregate, which permits down-weighting, or reduced weight values for certain events such as older or stale events, for example.

(3) Clustering of granular events. Preferably, for each type of event, events are clustered into an advantageous number of groups k based on the event's information content for target prediction. The information that an event E has about the target is advantageously captured by the empirical target distribution from all users who had the event E.

In relation to clustering, an example of an event E, is issuing a search query having search terms such as the terms "digital camera." An example of the event information content includes the number of clicks on an advertising category such as the category "Finance." A sample empirical target distribution for this example then has a set of distribution values such as, 50% for no clicks, 30% for one click, 10% for two clicks, and 10% for four clicks. One of ordinary skill realizes that these values are used herein for the purpose of illustration only, and further recognizes additional distribution values. Preferably, the distance between two of such distributions is measured by KL (Kullback-Leibler) divergence.

Clustering events in this way tends to preserve the predictive information about the target that is associated with the event. The parameter k is advantageously user-defined, pre-defined, and/or selected. After clustering, each cluster generates one input feature that is aggregated over all granular events in the cluster. In addition to dimensionality reduction, there are other advantages for clustering granular events. For instance, new events are advantageously assigned to existing clusters. Moreover, clusters are optionally updated automatically and/or incrementally. Hence, these implementations cluster granular events in an information-preserving manner.

Some embodiments perform additional preprocessing functions at the step 220, alternatively or in conjunction with the pruning, aggregating, and/or clustering functions described above. For instance, additional filtering is optionally performed to further preprocess the granular event data into preprocessed data that are more suitable to modeling.

Once preprocessing is performed at the step 220, one or more models are constructed at the step 230. As mentioned above, the preprocessing phase preferably further facilitates the model building at the step 230. Particular instances of model generation are further described below. For instance, the example below illustrates the construction of a particular model in relation to a selected type of granular event. More specifically, the following example describes modeling click propensity by using generalized linear models. Hence, in the present example, after preprocessing at the step 220, each user U is represented by a set of input features $\{x\}$ whose cardinality is smaller than before preprocessing, but is still quite large. A natural and efficient approach for handling high dimensional data is to use generalized linear models, where the model parameters are linear combinations of the input features.

Two modeling approaches are then available, in this example. The first approach is to formulate the problem as a classification problem. In the classification problem, some implementations learn a linear model. The linear model of some of these implementations is then advantageously employed to distinguish a set of users based on predicted behavior, such as to distinguish clickers from non-clickers, for instance. In this instance, the target is binary, and represented by two click-classes, one class for clickers and another class for non-clickers. The target is then learned by applying any standard linear machine-learning model to the historical data, or stated differently, by training. As recognized by one of ordinary skill, linear learning machines include Support Vector Machines (SVM), Naïve Bayes machines, Maximum Entropy, logistic regression, and/or linear regression models.

For the support vector machines, the logistic regression and the linear regression models, the parameters are typically a set of linear weights ($w_{(x,A)}$), one for each individual input feature x and each advertisement, or ad group A.

For Naïve Bayes and Maximum Entropy models, there are typically two sets of probability weights for each advertisement, or ad group A:

$\{P(x|A,clicker)\}$ and $\{P(x|A,non-clicker)\}$.

Preferably, each set of probability weights is learned with maximum likelihood and maximum entropy principles, respectively.

The second modeling approach is to learn a linear model for either the click-through rate (CTR) or for the number of ad clicks directly. Ad click propensity is often measured by click through rate (=number-of-ad-clicks/number-of-ad-views), which is a ratio and thus not linear in the input features. For instance, a user who views more pages does not necessarily have a higher click through rate. For this reason, the number-of-ad-clicks and the number-of-ad-views are advantageously modeled separately. Further, separately, each of these is more reasonably modeled as a linear combination of input features.

Accordingly, some implementations use a generalized linear model with a Poisson distribution for the number-of-ad-clicks quantity. Thus, the probability of seeing n clicks for a certain advertisement, or ad group, A from the user U is defined as:

$$P(n \mid U, A, \Lambda) = \frac{\lambda_{(U,A)}^n e^{-\lambda_{(U,A)}}}{n!},$$

where $$\lambda_{(U,A)} = \sum_{x \in U} w_{(x,A)} x$$

is the expectation, or mean, of the distribution for the user U as represented by input features {x}, and the advertisement, or ad group, A. The weights {$w_{(x,A)}$} are the set of actual model parameters to be estimated from historical data and are preferably estimated by using a maximum likelihood approach:

$$\max_{\{w_{(x,A)}\}} \prod_U P(n \mid U, A, \Lambda).$$

The number-of-ad-views is optionally modeled in the same way, or calculated based on history directly, such as, for example, as a recency-weighted average of the number-of-ad-views in the past l days, where l is preferably predetermined and/or selected by empirical data.

Next, regardless of the particular model constructed at the step 230, the model is preferably trained at the step 240. For those models that employ a system of weights, training preferably results in tuning the weighting to optimize the performance of the model. Then, after the step 240, the process 200 concludes.

In specific cases, predictive modeling is implemented based on clicks of a link and/or views of a page, for which clicks and/or views it is desirable to make determinations. For instance, some implementations binary-ize the data and/or target into 1 and 0. For the case where the determination is for clickers versus nonclickers, binary 1 is arbitrarily assigned to clicker, and 0 is assigned to nonclicker.

The model construction described above typically includes a training phase, while the constructed model is preferably used for a separate scoring phase. The classification to separate the clickers is preferably established at the training stage. Also preferably, separate models are constructed for different data types. For instance, one model and/or type of model is constructed to predict how many clicks a user is expected to generate. Another model is constructed to model and/or predict how many views a user is expected to generate for a specific advertisement or ad group.

Scoring/Ranking Users

Figure 3:
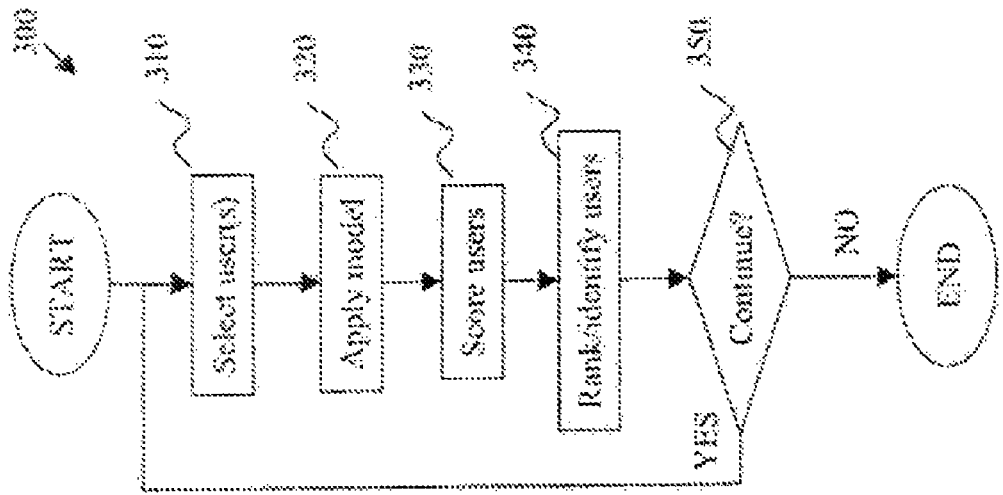
FIG. 3 is a process of scoring and/or ranking

Once a behavioral targeting model is constructed and/or trained by using the various means described above, the model is advantageously applied in various ways. FIG. 3 illustrates a process 300 for scoring and/or ranking users. As shown in this figure, the process 300 begins at the step 310, where one or more users are selected for scoring. At the step 320 a model is applied to the selected user(s). Some embodiments use the trained model of FIG. 2. Then, the users are scored at the step 330, by using the model.

At the scoring phase, a user is scored over a predetermined time period. In some cases the scoring time period is ongoing, unlimited, and/or infinite. In these cases, time-decayed event counts and/or time-decayed scores are preferably used. Further, the time period can go back to whenever calculation of the time-weighted granular event counts started. In a particular embodiment, such counts are incrementally updated on a daily basis.

Some implementations track events by using one count for each type of event such as, for example, number of searches, number of page views, number of ad views, and/or number of ad clicks. These implementations count, track, and/or store a quantity of occurrences for the event. Hence, for searching, these embodiments store a number that represents the number of searches performed on the particular search term. Hence, this type of implementation advantageously collects data at a highly granular level. For example, taking into account one search at the granular level, the number of searches for a specific query term is tracked. The count is preferably recorded for each user over a period of time, such as one month, to provide a set of comparable scores for each of the users.

Also at the scoring stage, some implementations output a continuous score that is optionally used to rank users. Some of these implementations further target the top users, based on ranking for additional targeting activities. For instance, when the desirable result or metric includes click through rate (CTR), some embodiments identify and/or select the top 10% or, as another example, the top 1% of users based on click through rates. Typically, there is a tradeoff between targeting users with higher click through rate, and reach, in the number of users targeted. Commercially, it is advantageous to provide targeting selections for both greater click through rate, and/or reach, and to charge for each type of targeting, accordingly.

For the case of the binary target given above (1 for clickers and a 0 for non-clickers), some embodiments simply score each user by using one or more learned linear models, and thus as a linear combination of input features. For instance:

$$\text{Score}_{(U,A)} = \sum_{x \in U} w_{(x,A)} x$$

For Naïve Bayes and Maximum Entropy models, users are instead advantageously scored by using:

$$\frac{\prod_x P(x \mid A, \text{clicker})}{\prod_x P(x \mid A, \text{nonclicker})},$$

or for a more practical implementation, by using:

$$\sum_x [\log(P(x \mid A, \text{clicker})) - \log(P(x \mid A, \text{nonclicker}))].$$

For Poisson type models, the ratio between predicted number of ad clicks and number of ad views is preferably used to score each user. Hence, for each user U and each advertise ment or ad group A, the predicted click through rate (CTR) is calculated as:

$$\overline{CTR}(U, A) = \frac{\lambda_{(U,A)}^{(c)}}{\lambda_{(U,A)}^{(v)}},$$

where the numerator is a prediction for the number of ad clicks and the denominator is a prediction for the number of ad views. For infrequent users, this ratio is often undesirably unstable and inaccurate. Hence, the estimation is preferably enhanced in various embodiments instead to be:

$$\overline{CTR}(U, A) = \frac{\lambda_{(U,A)}^{(c)} + \lambda_0^{(c)}}{\lambda_{(U,A)}^{(v)} + \lambda_0^{(v)}},$$

where $\lambda_0^{(c)}$ and $\lambda_0^{(v)}$ are prior counts for clicks and views, respectively. The prior counts are then selected to achieve the best user ranking.

Regardless of the particular scoring method and/or formula used for scoring at the step 330, the score is then used at the step 340. For instance, some embodiments rank the users in sorted decreasing order and/or identify particular users for additional processing. Then, at the step 350, it is determined whether the process 300 should continue. If the process 300 should continue, as part of a real time process, for example, then the process 300 returns to the step 310. Otherwise, the process 300 concludes.

FIGS. 4 and 5 illustrate system implementations 400 and 500, in accordance with the processes 200 and 300 described above. As shown in FIG. 4, the system 400 includes a number of granular events 402 that are collected and/or stored by the system 400. Hence, some systems include data storages for the monitoring, collection, storage and/or retrieval of the granular events 402. As described above, the granular events are typically numerous and include such user activities as viewing a web page, clicking on a link in the page, clicking on an advertisement in the page, issuing a search query, such as by using a search engine, filling out a form, posting, rating a page, rating a product, and/or performing a transaction.

The various granular events 402 are received by the preprocessor 404, which performs one or more of the preprocessing functions described above such as pruning, aggregating, and/or clustering of the data, for example. Some implementations further perform additional filtering functions to preprocess the granular data into preprocessed data for modeling. The preprocessor 404 preferably includes one or more modules 406 and 408 for performing the various tasks.

Figure 6:
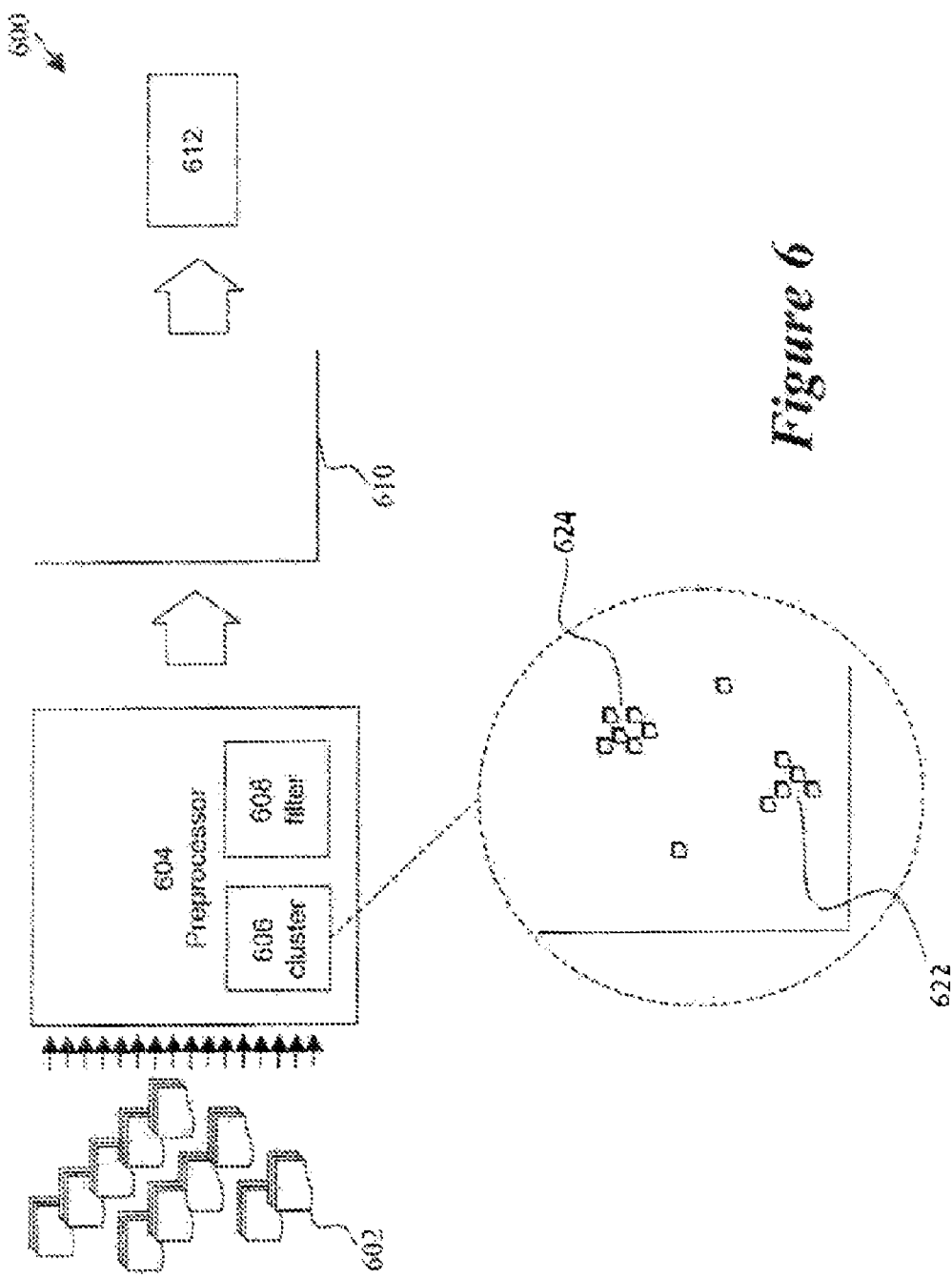
FIG. 6 illustrates a clustering performed by some embodiments.

For instance, FIG. 6 conceptually illustrates the clustering performed by some embodiments. In FIG. 6, a system 600 employs a module 606 to cluster granular event data about particular targets. As described above, the targets are related to a variety of user behaviors such as, for example, searching regarding particular terms, viewing and/or clicking certain web pages, search results, and/or advertisements. Moreover, the clustering preferably occurs without the need and/or independent of categories and/or categorization. Hence, regardless of the specific target, the exemplary clusters 622 and 624 advantageously retain information associated with the clustered granular events.

Returning to the more general implementation illustrated by FIG. 4, the preprocessor 404 outputs, to a model generator 410, preprocessed data in the form of feature data that is based on the granular events. The model generator 410 is used for the creation of various types of models, as described above. For instance, some model generators 410 include a feature space, for model construction and/or training. Preferably, the system 400 outputs a trained model 412, for use in scoring one or more users. Such a use is further described in relation to FIG. 5.

FIG. 5 illustrates a system 500 that scores and/or ranks one or more users. As shown in this figure, the system 500 includes one or more users that are selected by a selector 511 for the system 500. For instance, the selector 511 of a specific implementation selects users based on group membership or demographic information. As with granular events, the users generating the granular events are typically numerous. However, the users preferably each have a unique identifier for tracking. The selector 511 outputs the selected users by using the unique identifiers to a model engine 512 that has one or more constructed and/or trained models. Typically, the model(s) are trained to indicate a relationship to a desired result. Some embodiments employ the model constructed and/or trained by the systems and methods described above.

The model engine 512 of some embodiments outputs to a scoring module 514 that preferably tracks scores for several users. Some of these embodiments further rank the scored users in relation to each other to further permit determinations regarding targeting. For instance, in an implementation regarding propensity to click on a certain advertisement, the scoring module 514 identifies higher propensity users for targeting. These users are selectively passed to other components of the system 500 or other systems for further targeting.

Use in Conjunction with Targeting System

As described above, a behavioral targeting system has application to identify interests and behavior of online users for one or more target objectives. Embodiments of the invention are advantageously incorporated into such a user targeting system. FIG. 1 is a block diagram illustrating a generalized behavioral targeting system 100. In general, the behavior targeting system 100 profiles interests and behavior of Internet users based on the user's online activities. As shown in FIG. 1, user input 110 is captured by behavioral targeting processing 120. In one embodiment, user input comprises one or more events that are often highly granular and/or numerous.

The behavioral targeting processing 120 preferably employs one or more of the implementations described above, and optionally outputs to additional targeting system components. In the embodiment shown in FIG. 1, the behavioral targeting system 100 outputs to components for direct response advertising 130, brand awareness advertising 150, purchase intention activities 180 and/or intra-company business unit marketing 190.

Network Environment

Figure 7:
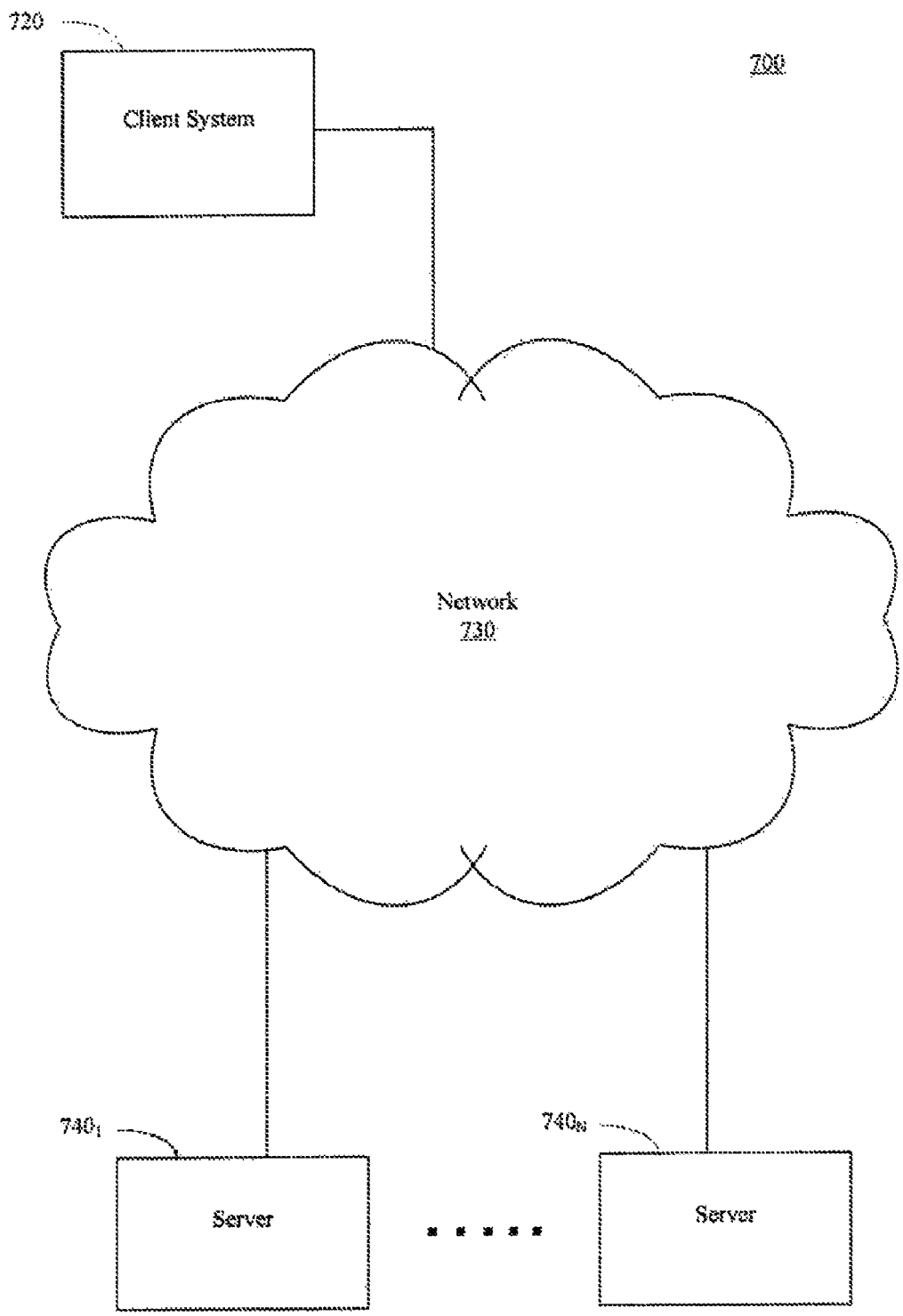
FIG. 7 illustrates a network environment, in accordance with some embodiments.

FIG. 7 illustrates an embodiment of a network environment 700 for operation of the behavioral targeting system of some embodiments. The network environment 700 includes a client system 720 coupled to a network 730, such as the Internet, an intranet, an extranet, a virtual private network, a non-TCP/IP based network, any LAN or WAN, or the like, and server systems $740_1$ to $740_N$. A server system includes a single server computer or, alternatively, a number of server computers. The client system 720 is configured to communicate with any of server systems $740_1$ to $740_N$, for example, to request and receive base content and additional content, for instance, in the form of a web page.

The client system 720 includes a desktop personal computer, workstation, laptop, PDA, cell phone, any wireless application protocol (WAP) enabled device, or any other device capable of communicating directly or indirectly to a network. The client system 720 typically runs a web browsing program that allows a user of the client system 720 to request and receive content from the server systems 740₁ to 740_N over the network 730. The client system 720 typically includes one or more user interface devices 722, such as a keyboard, a mouse, a roller ball, a touch screen, a pen or the like, for interacting with a graphical user interface (GUI) of the web browser on a display (e.g., monitor screen, LCD display, etc.).

In some embodiments, the client system 720 and/or the system servers 740₁ to 740_N are configured to perform the methods described herein. The methods of some embodiments may be implemented in software or hardware configured to optimize the selection of additional content to be displayed to a user.

Figure 8:
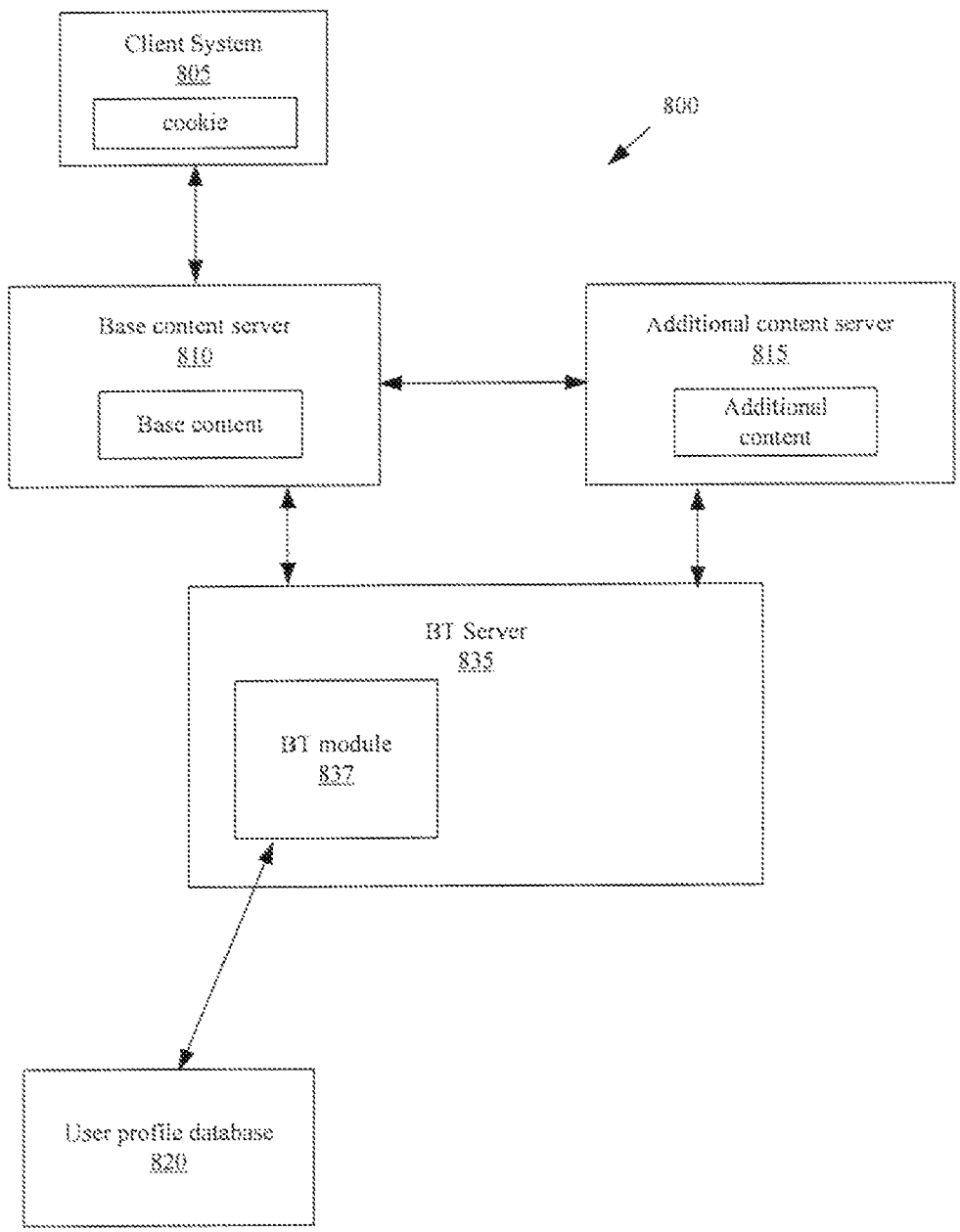
FIG. 8 illustrates a targeting system according to embodiments of the invention.

FIG. 8 shows a conceptual diagram of a targeting system 800. The targeting system 800 includes a client system 805, a base content server 810 for containing base content, an additional content server 815 for additional content, a database of user profiles 820, and behavioral targeting server 835. The behavioral targeting server 835 comprises an optimizer module 838 that receives event information. The targeting system 800 is configured to select additional content to be sent to a user based on the user's profile. The client system 805 is configured to receive the base and additional content and display the base and additional content to the user (e.g., as a published web page). Various portions of the optimization system may reside in one or more servers such as servers 740₁ to 740_N of FIG. 7 and/or one or more client systems, such as the exemplary client system 720.

The user profile database 820 stores user profiles for a plurality of users/client systems, each user profile having a unique user-identification number assigned for a particular client system 805 used by a user. The user-identification number may be stored, for example, on the client system 805 used by the user. When a user requests content from a base content server 810, the targeting server 835 selectively uses the user-identification number to retrieve the particular user profile from the user profile database 820.

The targeting system may be implemented in either hardware or software. For the software implementation, the targeting system is software that includes a plurality of computer executable instructions for implementation on a general-purpose computer system. Prior to loading into a general-purpose computer system, the targeting system software may reside as encoded information on a computer readable medium, such as a magnetic floppy disk, magnetic tape, and compact disc read only memory (CD-ROM).

Advantages

Some of the embodiments described above are relevant to the field of behavioral targeting, which is further described in the U.S. patent application Ser. No. 11/394,343, to Joshua Koran, et al., filed 29 Mar. 2006, which is incorporated herein by reference. Particular embodiments advantageously reduce some constraints for the difficult process of modeling. As mentioned above, conventional targeting systems rely heavily upon categorization prior to modeling, which undesirably results in significant information loss.

User behavior data tends to be highly granular, having many input features, and typically millions of inputs, and events. In contrast, categorization involves only a few selected categories. Taking one example of a user behavior event in the form of searching, for instance, many search queries simply do not fit neatly into a category. Hence, by some estimates, at least 40% of search queries are not categorized, and thus the information associated with these events is undesirably lost. Table 1 illustrates a list of example categories. Although Table 1, comprises a number of categories, and though many additional categories can be implemented, one of ordinary skill recognizes the disadvantages of limiting granular data within such categories.

Accordingly, some embodiments employ an efficient modeling system that handles high dimension inputs such as millions of inputs, for example. These embodiments advantageously preprocess the many granular events, without the need for categorization. One type of preprocessing, applies clustering to the granular features, rather than categorizing the features into a fixed taxonomy. In contrast to fixed categories, the preprocess step of clustering advantageously retains every input feature. Clustering, for example, aggregates search queries based on a target, and/or based on predictive power on the target. Embodiments that apply clustering are capable of ranking users based on a variety of granular user behavior events. For instance, some embodiments identify clickers versus nonclickers, while some embodiments rank users based on numbers of clicks.

For the user event of searching, each search using a specific query represents a granular event, and embodiments advantageously measure a distribution on the target of the query, to find similarities in the distribution. Based on the target distribution, certain useful probabilities are determined such as user propensities. In the binary example above, the probabilities of being a clicker and a nonclicker are preferably determined, while in the nonbinary example, the probability of some number of clicks N being exhibited, is preferably determined.

In the example of search-clicks given above, clustering is performed for the search data type. However, additional embodiments perform clustering for other data types. For instance, when the data type comprises Internet pages, the granular events of page views are advantageously clustered. Similarly, when the data type comprises online advertisements, advertisement views and/or ad clicks are preferably clustered for the particular advertisement of interest.

The foregoing embodiments advantageously preserve and/or maximize predictive power on the target by using clustering. These embodiments have multiple benefits in the form of both incorporating predictive power of behavioral events, and retaining many granular events rather than undesirably discarding events and the potentially useful information associated with the discarded events. Accordingly, alternative embodiments employ models that are based on a user, an advertisement, and/or on a group of advertisements. As sufficient granular event data pertaining to each user are collected, some embodiments further build for each user, a model that closely represents the user's behavior.

At the preprocessing stage, some implementations perform other functions, in addition to clustering. For example, some implementations also perform filtering of the numerous granular event data. In the case of searching, for instance, some embodiments will filter searches that are performed less than a threshold, such as fewer than three times in a month, for instance. These low frequency events are preferably filtered before modeling.

As users generate various granular events, they are mapped onto a predictive model. Preferably, the modeling includes a training phase and a scoring phase. In the scoring phase for each user, some embodiments count for a selected data type, a number of occurrences of granular events. For instance, alternative embodiments track and/or record a number of searches for a particular search query, a number of page views for a specific page, a number of advertisement views, and/or a number of ad clicks, for a selected advertisement. Hence, data are recorded at a highly granular level that advantageously retains much or all of the event information. Taking the data type of searching for example, at the granular level, some embodiments record a number of searches for a specific search query. Typically, the counting is for each user over a period of time, such as one month. These embodiments preferably do not rely on any taxonomy and categorization, and thus alleviate some of the burden of modeling large data sets that are customary with granular data. These embodiments thus produce more accurate predictive models.

Conventionally, each data type requires its own categorizer. As mentioned above the data types typically include: searches, search clicks such as the number of clicks after each search, sponsored search clicks, page views, advertisement views, and ad clicks. Moreover, as data arises from new areas, new categorizers must be built for each data type from each new area. As also mentioned above, the categories are potentially numerous and varied. Yahoo, for example, has such categories as Automobiles, Finance, Yahoo Groups, among many other categories. Conveniently, however, embodiments of the invention take into account granular events, directly and without the need for categorization, which enables these embodiments to employ a much simpler architecture over the art.

While the invention has been described with reference to numerous specific details, one of ordinary skill in the art will recognize that the invention can be embodied in other specific forms without departing from the spirit of the invention. For instance, the examples given above often relate to clicking on advertisements, and/or click rates. However, targeting across a range of behavioral activities and granular event types is contemplated as well. Thus, one of ordinary skill in the art would understand that the invention is not to be limited by the foregoing illustrative details, but rather is to be defined by the appended claims.

TABLE 1

Sample Categories.

\#

360°

A

Account Information
Address Book
Alerts
Answers
Anti Spyware
Anti-Virus
Ask Yahoo!
AT&T Yahoo! Dial
AT&T Yahoo! High Speed Internet
Auctions
Autos
Avatars

B

Babel Fish Translations
Banking Center
Bargains
Baseball - MLB
Bill Pay
Bookmarks
Briefcase
Business
Buzz Index

C

Calendar
Cars
Chat

TABLE 1-continued

Sample Categories.

Classifieds
Courses & Degrees

D

Dating
Del.icio.us
Developer Network
Dictionary
Directory
Directory Submit
Domains
Downloads
Driving Directions
DSL

E

Education
Elections
Encyclopedia
Entertainment

F

Family Accounts
Fantasy Sports
FIFA World Cup
Finance
Firewall
Flickr

G

Games
GeoCities
Golf
Greetings
Groups

H

Health
Help
Horoscopes
HotJobs

I

Insurance
International
Internet Access

J

Jobs

K

Kids

L

Loans
Local
Lottery

M

Mail
Maps
Member Directory
Merchant Solutions
Message Boards
Messenger
Mobile
Mobile Games
Mobile Wallpaper
Movies
Music
Mutual Funds
My Yahoo!

N

NASCAR
NBA
NCAA Basketball
NCAA Football

TABLE 1-continued

Sample Categories.

News
NFL
NHL
Norton Internet Security
Notepad

P

Parental Controls
People Search
Personals
Pets
Photos
Picks
Podcasts
Points
Pop-Up Blocker
Premium Services
Publisher Network

R

Radio
Real Estate
Reference
Ringtones

S

Search
Search Marketing
Security Center
Shopping
Small Business
Soccer
Sponsor Listings
Sports
Spyware Removal
Stock Quotes

T

Taxes
Tech
Tennis
The Spark
Tickets
Tones
Toolbar
Travel
TV

U

Upcoming.org

V

Verizon Yahoo! for DSL
Video
Video Games
Voice

W

Wallet
Weather
Web Hosting
Widgets

Y

Yahoo! by Phone
Yahoo! Next
Yahoo! Phone Card
Yahooligans!
Yellow Pages

What is claimed is:

1. A computer implemented method of behavioral targeting comprising:
receiving, at a computer, a plurality of granular events, wherein a granular event comprises an on-line activity between a user and an entity;
preprocessing, using a computer, the received granular events to determine informational content of each granular event;
generating, in a computer, preprocessed data comprising a plurality of input features by grouping the granular events into a plurality of clusters based on the informational content, wherein each cluster corresponds to a unique input feature from among the input features; and
generating, in a computer, a predictive model based on a linear machine-learning model, the predictive model for determining, using the clusters and a linear combination of their corresponding input features, a likelihood of a predicted input action by a user.

2. The computer implemented method of claim 1 wherein the linear machine-learning model is at least one of a Support Vector Machine (SVM), a Naïve Bayes machine, Maximum Entropy, a logistic regression, and a linear regression model.

3. The computer implemented method of claim 1, wherein the granular event comprises at least one of viewing a web page, clicking on a link in the web page, clicking on an advertisement in the web page, issuing a search query, using a search engine, filling out a form, posting, rating a page, rating a product, and performing a transaction.

4. The computer implemented method of claim 1, wherein the online activity comprises a search and the method further comprises tracking a number of clicks on a search result.

5. The computer implemented method of claim 1, wherein the online activity comprises a page view and the method further comprises counting, for each page of a plurality of pages, a number of page views.

6. The computer implemented method of claim 1, wherein the informational content comprises at least one of search, search-click, sponsored search-click, page view, advertisement view, and advertisement click.

7. The computer implemented method of claim 1, wherein the preprocessing comprises at least one of pruning, aggregating, and filtering the received granular events.

8. The computer implemented method of claim 1, further comprising scoring the user based on a linear combination of granular event counts from a behavioral history.

9. The computer implemented method of claim 1, further comprising scoring the user based on a ratio between an estimated probability of being a clicker and an estimated probability of being a non-clicker.

10. The computer implemented method of claim 1, further comprising:
ranking the user in relation to other users based on a plurality of user scores;
generating a set of ranked users; and
identifying a subset of ranked users for additional targeting steps.

11. A non-transitory computer readable medium that stores a set of instructions which, when executed by a computer, cause the computer to execute steps for behavioral targeting, the steps comprising:
receiving a plurality of granular events, wherein a granular event comprises an on-line activity between a user and an entity;
preprocessing the received granular events to determine informational content of each granular event;
generating preprocessed data comprising a plurality of input features by grouping the granular events into a plurality of clusters based on the informational content, wherein each cluster corresponds to a unique input feature from among the input features; and
generating a predictive model based on a linear machine-learning model, the predictive model for determining, using the clusters and a linear combination of their corresponding input features, a likelihood of a predicted input action by a user.

12. The computer readable medium of claim 11 wherein the linear machine-learning model is at least one of a Support Vector Machine (SVM), a Naïve Bayes machine, Maximum Entropy, a logistic regression, and a linear regression model.

13. The computer readable medium of claim 11, wherein the granular event comprises at least one of viewing a web page, clicking on a link in the web page, clicking on an advertisement in the web page, issuing a search query, using a search engine, filling out a form, posting, rating a page, rating a product, and performing a transaction.

14. The computer readable medium of claim 11, wherein the online activity comprises a search and the method further comprises tracking a number of clicks on a search result.

15. The computer readable medium of claim 11, wherein the online activity comprises a page view and the method further comprises counting, for each page of a plurality of pages, a number of page views.

16. The computer readable medium of claim 11, wherein the informational content comprises at least one of search, search-click, sponsored search-click, page view, advertisement view, and advertisement click.

17. The computer readable medium of claim 11, wherein the preprocessing comprises at least one of pruning, aggregating, and filtering the received granular events.

18. The computer readable medium of claim 11, further comprising scoring the user based on a linear combination of granular event counts from a behavioral history.

19. The computer readable medium of claim 11, further comprising scoring the user based on a ratio between an estimated probability of being a clicker and an estimated probability of being a non-clicker.

20. The computer readable medium of claim 11, further comprising:
ranking the user in relation to other users based on a plurality of user scores;
generating a set of ranked users; and
identifying a subset of ranked users for additional targeting steps.

* * * * *